United States Patent [19]

Bruce et al.

[11] 4,403,006
[45] Sep. 6, 1983

[54] SAG-RESISTANT GYPSUM BOARD CONTAINING COAL FLY ASH AND METHOD FOR MAKING SAME

[75] Inventors: Robert B. Bruce, Burlington; Richard A. Kuntze, Mississauga, both of Canada

[73] Assignee: United States Gypsum Company, Chicago, Ill.

[21] Appl. No.: 129,870

[22] Filed: Mar. 13, 1980

[30] Foreign Application Priority Data

Oct. 1, 1980 [CA] Canada ................................ 343439

[51] Int. Cl.³ .......................... B32B 1/04; B32B 5/18; B32B 13/04; B32B 31/00
[52] U.S. Cl. ........................................ 428/70; 156/39; 428/71; 428/312.4; 428/317.9; 428/703
[58] Field of Search ...................... 428/306, 68, 70, 71, 428/703, 312.4, 317.9; 52/DIG. 7; 156/39; 264/DIG. 49; 106/86, DIG. 1

[56] References Cited

U.S. PATENT DOCUMENTS

| 2,731,377 | 1/1956 | Piddell et al. | 428/539 |
| 3,616,173 | 10/1971 | Green et al. | 156/42 |
| 3,854,968 | 12/1974 | Mirnick et al. | 106/DIG. 1 |
| 4,081,283 | 3/1978 | Farland et al. | 106/DIG. 1 |
| 4,087,285 | 5/1978 | Kurz | 264/49 |
| 4,164,526 | 8/1979 | Clay et al. | 428/306 |
| 4,238,546 | 12/1980 | Phillips | 428/703 |
| 4,240,952 | 12/1980 | Hulbert, Jr. et al. | 260/42.13 |

FOREIGN PATENT DOCUMENTS

| 236379 | 10/1961 | Australia | 106/110 |
| 2808723 | 9/1979 | Fed. Rep. of Germany | |
| 54325 | 12/1967 | Poland | 106/DIG. 1 |

Primary Examiner—William J. Van Balen
Attorney, Agent, or Firm—Kenneth E. Roberts; Robert H. Robinson; Samuel Kurlandsky

[57] ABSTRACT

A gypsum board consisting essentially of a monolithic cellular core of set gypsum and a fiberous cover sheet encasement provided with improved properties by the gypsum core having incorporated therein coal fly ash in an amount of about 1–20% by weight of stucco in the gypsum slurry used in forming the board and method of producing the board are disclosed.

10 Claims, 10 Drawing Figures

SAG-RESISTANT GYPSUM BOARD CONTAINING COAL FLY ASH AND METHOD FOR MAKING SAME

BACKGROUND OF THE INVENTION

1. Field of the Invention

The present invention relates to improved gypsum board products, and more particularly to gypsum boards having improved properties for use in humid areas.

Gypsum board products comprising a monolithic core of set, interlaced gypsum crystals disposed between fiberous, especially paper, liners are well known in the art. Gypsum board is normally produced by feeding a slurry of calcium sulfate hemihydrate (stucco), water, foam, and any other desired additive such as setting time modifiers, between two sheets of paper and the like fiberous material. After conversion of the stucco to gypsum (calcium sulfate dihydrate) the set but still wet board is conveyed through a drying chamber to remove excess water. Such gypsum core boards, including lath and sheathing boards, have been employed in building construction for a long time in the construction of interior walls and ceilings, and are commonly referred to as gypsum wallboard, plasterboard and so forth. Such boards are presently commercially available in various thicknesses, generally $\frac{1}{4}$th inch to $\frac{5}{8}$th inch. Paper covered gypsum wallboard currently being marketed in a $\frac{1}{2}$ inch thickness generally weighs between 1650 and 2150 lbs. per thousand square feet. At the low end of this range, the gypsum core has a density of about 40-42 lbs. per cubic foot and a compressive strength of about 450 psi.

As is well known in the building industry such gypsum boards may tend to exhibit a visible sagging after installation, particularly in ceiling constructions under humid conditions. This may become quite evident especially in the middle of ceiling mounted board nailed to 16 inch to 24 inch spaced apart supporting members. Certain surface decorations increase the tendency to sag.

2. Description of the Prior Art

Coal fly ash is the portion of very fine ash of furnaces burning powdered coal that passed into the stack and is recovered from the stack gases as a necessary step to decrease pollution of the atmosphere. Coal fly ash is obtained principally by removal from power plant flue gases burning various grades of coal, whether lignite or bituminous, via such means as electrostatic precipitators, venturi scrubbers and the like or collected in a baghouse. Thus, coal fly ash is a synthetic by-product in manufacturing processes and is distinguished not only in method of derivation but also in physical and chemical properties from naturally occuring aluminate or silicate minerals such as perlite ore, vermiculite ore, volcanic ash, colloidal silica and the like.

Recently coal fly ash has been finding increased practical uses in industry either as inert lightweight filler or in combinations with small amounts of gypsum and a lime source to activate its pozzolanic activity. Thus coal fly ash has been suggested along with other fillers for use in compositions such as dense gypsum metal casting molding compositions (U.S. Pat. No. 4,148,760) thermal and sound insulating gypsum construction material (Chem Abstracts 79:3426e and 90:10893h). For example further, fly ash has been added to the Portland cement used in making concrete. Here large quantities of fly ash, in proportions of up to about half of the Portland cement in the cement-aggregate mixture, are added to react with lime generated during the setting of the Portland cement to produce additional cementitious compounds. Utilization of fly ash in this manner often results in substantial cost savings. A saving of over 1 million dollars in the construction costs, for example, of the Hungry Horse dam has been reported. It has been stated that concrete made with Portland cement and coal fly ash has greater strength and less heat of hydration, is more resistant to chemical action by acids, alkalis and sulfates. See *Chemical Abstracts* 90:75704z; 87:121882u; and 86:160087n.

There have been other attempts to take advantage of the high lime reactivity of coal fly ash. Thus U.S. Pat. No. 2,785,988 discloses a non-hydraulic construction material comprising alpha hemihydrate calcium sulfate, gypsum (dihydrate) and a silica highly reactive to lime such as coal fly ash, to obtain accelerated sets and high compressive strengths in the admixtures.

Naturally occuring silicate minerals such as vermiculite ore and perlite ore have been incorporated in the manufacture of gypsum boards generally to add higher fire resistance properties in the case of the unexpanded natural ores or lighter weight and lower density in the case of the fluffy expanded particles. See for example U.S. Pat. Nos. 2,009,146 and 3,376,147. Natural mineral silicates are a common constituent in a great many materials since silicon oxide is so abundantly found in inorganic matter. Thus, certain clays, volcanic glasses, lava fragments and the like that are glassy in character and contain silica have been used as aggregates in gypsum board manufacture. See U.S. Pat. No. 1,574,252.

Concerning another additive unrelated other than that it is said to be high in silicate content and a by-product of certain manufacturing processes, U.S. Pat. No. 4,087,285 discloses a method for strengthening glasses and other vitreous products by adding certain condensed flue gases or "filter dusts" obtained from specific manufacturing processes as a flux. The filter dusts disclosed here appear to have as their characteristic feature a uniform minute particle size with enormous specific surface in excess of 20 m$^2$/g, or 200,000 cm$^2$/g, and a very high silicate content. The primary example of such waste dust appears to be the condensed flue gases in the manufacture of ferro-silicon, as a type of synthetic "fumed silica". Another principal type disclosed appears to be the fine powdery waste from perlite expansion said to contain 70-75% SiO$_2$ and 12-15% Al$_2$O$_3$ which again would have the averred characteristic uniform minute particle size and enormous specific surface. Such materials are alleged in this patent to also be usable in contributing increased mechanical strength in the manufacture of boards such as gypsum board by some unspecified action mechanism.

SUMMARY OF THE INVENTION

It is a well known phenomenon of the art that as the thickness of gypsum board increases, its resistance to sagging under humid conditions increases. Paper covered gypsum wallboard of $\frac{5}{8}$ inch thickness generally will exhibit only about half the sag encountered with paper covered gypsum wallboard of $\frac{1}{2}$ inch thickness.

It is one object and principle advantage of the present invention to provide gypsum board having improved properties for use in humid areas such that the resistance to sag of ½ inch board is improved to the point that it behaves similar to ⅝ inch thick gypsum board.

Another object is the provision of a process for the production of fiberous cover sheet encased gypsum board provided with improved sag properties.

It was surprisingly found in the present invention that the addition of coal fly ash of widely varying chemical and physical characteristics in a small amount such as 5% and more generally about 1-20% by weight of the stucco used in making the gypsum slurry for forming a gypsum board, of the type comprising a monolithic cellular core of said gypsum and a fiberous cover sheet encasement, greatly improved the sag resistance properties of the gypsum board. This was particularly surprising in view of the facts that the incorporation of the coal fly ash lowered the compressive strength of the set gypsum core and in addition does not appear to be dependent upon chemical composition of mineral oxides in the fly ash or physical properties of the fly ash. There does however tend to be generally confirmation of the fly ash as useful for this purpose, despite its highly variable physical and chemical properties, with regard to average particle size an specific surface areas.

BRIEF DESCRIPTION OF THE DRAWINGS

FIGS. 2 through 5 are a series of scanning electron microphotographs at various magnifications as follows:

DESCRIPTION OF THE PREFERRED EMBODIMENTS

Previous to this invention it had been assumed by those skilled in the art that addition of coal fly ash to a gypsum matrix would not offer any unusual properties. At most, what might have been extrapolated from unrelated art would be that the material would act only as an inert filler or with the further addition of lime might give an increase in compressive strength. However the present invention has found that not only is there great resistance to sag introduced by the addition of small amounts of coal fly ash but also there is a decrease of compressive strength of the gypsum matrix core.

In the present invention it has been found that coal fly ashes from a wide variety of coal sources scattered around the United States and Canada perform well in reducing sag in gypsum board. Physically, the useful coal fly ash materials may be generally categorized as small spheres that have a high surface area for their fine particle size (see FIG. 3c). Generally the coal fly ash particles will range in particle size on the order of about 0.5 through 200 microns, with most of the particles between about 1 and 25 microns and about 90% of the particles by numerical count below 50 microns. The particles will have a surface area, by the B.E.T. method of generally less than 20 m$^2$/g and preferably on the order of about 0.5-10 m$^2$/g; and a surface area measurement by the Blain method on the order of about 1,000-6,000 cm$^2$/g. It has been further established that those coal fly ash particles of 1,000-6,000 cm$^2$/g Blaine can be ground to finer sizes and still retain the activity for reducing sag in gypsum board, i.e., the particles can be ground in a ball mill or other apparatus to increase the surface area to about 10,000 or more cm$^2$/g Blaine and the activity of the ground particles for reducing sag in gypsum board is still evident. Thus surface areas of useful particles will be broadly between about 0.1-20 m$^2$/g by the B.E.T. method.

The chemical characteristics of the coal fly ash are highly variable being dependent predominantly on the geology of the occurence of the particular coal source. Coal seams commonly occur in strata of clay, shale or limestone and the basic constituent of coal that ends up as the fly ash is an impure clay mineral or shale. Surprisingly coal fly ashes that worked well in reducing sag in gypsum board in one set of samples that was chemically ananlyzed included such chemically diverse coal fly ashes as ones containing up to about 46% ferric oxide as well as others containing up to about 66% silicon oxide. In a summary analysis of materials that were analyzed in useful coal fly ashes, principal chemical constituents appeared as follows:

calcium oxide 1.6-28%
ion oxide 3.9-46%
aluminum oxide 13-27%
silicon oxide 33-66%

At present it is not clear what it is about fly ash that causes it to be effective in reducing sag of gypsum board. In one sense the action of fly ash in reducing sag in a gypsum matrix appears to be one of a particle physical or surface phenomena in the sense that if a typical sample of a particular fly ash that is very good in reducing sag in gypsum board and another that is about average for coal fly ashes are separated into their coarser and finer fractions, the finer fractions give better results in reducing sag. The same thing was true when the good example and the average sample were ground to double their surface areas. Further wash waters from washing coal fly ashes were not effective in reducing sag. However it does not appear to be a simple matter of either particle size or surface area of the particles since firstly, other materials of about the appropriate particle size or surface areas, such as glass microballoons, were not at all effective in reducing sag. Secondly this is clearly not just a surface phenomena with the coal fly ash material because when the surface of the particle is treated with an acid to wash the surface of the particles to change the chemistry of the surface of the coal fly ash particle without adding any other reagents to the gypsum slurry mass, all activity in reducing sag was lost. Finally, attempts to correlate sag reduction activity to principal constituents in the coal fly ash particle showed no correlation.

It has been found in the present invention that the addition of small concentrations exhibits a strong effect in reducing sag of the resultant gypsum matrix. Thus in general coal fly ash in amounts of about from 1-20% by weight of stucco may be added. Substantially more or some less may be used but apparently without further substantial advantage. Highly satisfactory results have been obtained with generally 1-3% by weight of stucco with some fly ashes. It is thus generally preferred that about 4-6% by weight of stucco be added since there is some variance in effectiveness between different ashes sampled to insure that there is a very marked sag reduction to the resultant board.

Figure 1:
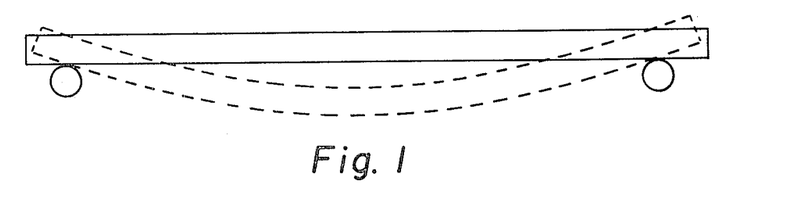
FIG. 1 is a drawing illustrating physical deformation of a gypsum slab during the sag of an unrestrained slab sample.

Referring to FIG. 1 for illustration there is provided in accordance with the invention a gypsum core for board consisting essentially of a monolithic cellular core of a set gypsum matrix having included therein a small amount of coal fly ash with the gypsum core being encased in a cover sheet (not shown) for support e.g., on 16 inch mounting centers (and shown in FIG. 1 supported on 14 inch centers).

The gypsum board can be made in conventional manner with the coal fly ash being incorporated in the gypsum (calcium sulfate dihydrate) core in an amount from about 1-20% by weight of the stucco used in forming the slurry to be fed to the board forming machine, and preferably in an amount of 5% by weight. Conventional additives such as foams, setting time control agents, bonding agents for the cover sheets and the like can be employed in regular manner so as to form gypsum board. Thus, for example, an aqueous slurry of stucco (beta hemihydrate calcium sulfate) can be prepared and the coal fly ash added thereto in any desired amount. Foam can then be added to reduce the density of the slurry with the resulting slurry being deposited between cover sheets of paper or the like. The gypsum boards can then be prepared in any desired thickness such as for example, $\frac{1}{4}$ to $\frac{5}{8}$ inch in thickness, as is common in the building art. The gypsum board can be made in various sizes and various types of fiberous cover sheets can be employed to encase the board. After setting of the hemihydrate to interlaced gypsum crystals in the core of the wet board, the set but still wet board is conveyed through drying chambers to remove excess water. Since in hydrating from stucco to gypsum about 18% by weight of water of crystallization will be added, the amount of coal fly ash by weight based on the weight of gypsum in the set dried board can be readily determined. It has been calculated that in a particular gypsum board containing 1675 pounds of gypsum per thousand square feet there is the hydrated equivalent of 1420 pounds of stucco. Thus, for the present invention when 4% of fly ash based on the weight of stucco has been added to the slurry the resultant board contains 3.47% of fly ash by weight of gypsum in the board. For a 6% addition based on stucco the resultant board would contain 5.21% of fly ash by weight of set gypsum.

For a more complete understanding of the invention, reference will be made to the following specific examples which are set forth for illustrative purposes only.

EXAMPLE 1

Samples of coal fly ashes obtained from a wide variety of coal sources and divergent locations were evaluated for effectiveness in reducing the sag of a typical gypsum board core. The various fly ash sources were as follows:

Fly ash sample #—Description

Fly ash #1—power plant in Saskatchewan, Canada burning subbituminous coal from local sources Fly ash #2—power plant in Alberta, Canada burning local subbituminous coal Fly ash #3—power plant in Alberta, Canada burning local subbituminous coal Fly ash #4—power plant in Alberta, Canada burning local subbituminous coal Fly ash #5—power plant in Alberta, Canada designed to burn mine tailings (often containing a 70% ash load in the burning) using subbituminous local coal Fly ash #6—power plant in New Brunswick, Canada burning highly volatile bituminous coal from local sources Fly ash #7—power plant in Novia Scotia, Canada burning highly volatile bituminous coal from local sources Fly ash #8—power plant in Ontario, Canada burning bituminous coal from W. Va., U.S.

Fly ash #9—power plant in Alberta, Canada burning local subbituminous coal

Fly ash #10—50/50 weight composite from two burners for fly ash #4

Fly ash #11—composite from last row of fines hoppers from ore precipitation for fly ash #4

Fly ash #12—50/50 weight composite from two other burners for fly ash #4

Fly ash #13—Sample from another burner-precipitator combination for fly ash #4

Fly ash #14—power plant in N. Mex., U.S. burning subbituminous coal from local sources Fly ash #15—obtained from commercial sources burning subbituminous coal from Colo., U.S.

Fly ash #16—obtained from commercial sources burning subbituminous Iowa, U.S. coal Fly ash #17—obtained from power plant combustion in Okla., U.S. using local subbituminous coal Fly ash #18—power plant in Nebr., U.S. burning local subbituminous coal Fly ash #19—power plant in N. Dak., U.S. using local lignite source Fly ash #20—power plant in Wyo., U.S. using subbituminous coal Fly ash #21—power plant burning lignite in N. Dak., U.S.

Fly ash #22—obtained from power plant burning lignite in N. Dak., U.S.

Fly ash #23—obtained from power plant in Tex., U.S. burning lignite

Fly ash #24—power plant in Mont., U.S. burning local subbituminous coal

Fly ash #25—Wyoming power plant burning local subbituminous coal

Fly ash #26—power plant in Wyo., U.S. burning subbutiminous coal

Fly ash #27—obtained from commercial sources deriving ash from Southern Ill., U.S. coal Fly ash #28—commercial source deriving fly ash from Wyo. U.S. coal of unknown character Fly ash #29—commercial source deriving fly ash from Wyo. U.S. coal of unknown character Fly ash #30—commercial source, origin of coal unknown Fly ash #31—commercial source, fly ash derived from Ind., U.S. coal Fly ash #32—commercial source, ash derived from Western U.S. coal Fly ash #33—commercial source, ash derived from Western U.S. coal Fly ash #34—commercial source, ash derived from Wyo., U.S. coal Fly ash #35—commercial source, source of coal unknown Fly ash #36—commercial source, ash derived from Wyo., U.S. coal Fly ash #37—commercial source, ash derived from Eastern Pa., U.S. coal Fly ash #38—commercial source, ash derived from Colo., U.S. coal For this evaluation, the various fly ash samples were each uniformly blended with 400 gram batches of a standard stucco powder mix for feeding to a gypsum board making slurry mixer. The powdered stucco-fly ash blend was sifted into 520 grams of deionized water at room temperature and mixed in a Waring Blender for exactly 7 seconds. The slurry was then poured into a mold to form a slab measuring 7/16th inch by 4 inches by 16 inches. Control slabs without any coal fly ash addition were also cast in the same dimensions except one control had a thickness of 7/16th inch (the core for ½ inch gypsum board) and the other of 9/16th inch (the core for ⅝ inch gypsum board). The water/stucco ratio and mixing method had been adjusted to give slabs of density 0.70±0.02 grams per cubic centimeter.

For measuring sag of the slabs, the slabs were placed in a 12 inch by 36 inch by 48 inch acrylic box equipped with a 3 inch diameter flexible plastic tubing connected to a controlled temperature-humidity chamber. The controlled chamber consisted of a VAPOR-TEMP controlled relative humidity chamber manufactured by Blue M Electric Company of Blue Island, Ill. which controlled relative humidity to within ±1% and temperature within 1° F. The humidity chamber had been modified to replace the standard bell jar with a 16 inch by 24 inch acrylic box to which the sample sag chamber box is attached by the 3 inch diameter flexible plastic tubing. Air circulation between these two acrylic chambers was effected with a squirrel cage fan of capacity to change the air in the sag chamber every few seconds. Attached to the back inside wall of the sag chamber were 4 rows of ½ inch aluminum rods placed such that columns of 4 inch by 16 inch gypsum slabs could be supported as shown in FIG. 1, one inch from each end of the slab in a horizontal position. A millimeter scale was mounted vertically at the mid-point of each column of slabs and immediately in front of each slab. The humidity chamber was placed in a room in which the temperature was held constant at 70° F. Using this apparatus with a dry bulb setting of 3.30° C. (91.4° F.) and a wet bulb setting of 31.8° C. (89.2° F.), the conditions of the test chamber were held constant at 33.5±0.5° C. (92±1° F.) and 91±2% relative humidity. The slabs were measured for sagging, shown by dotted lines in FIG. 1, by reading their relative position with respect to the measuring scale at various timed intervals.

For the instant evaluation and to better represent in use varying temperature/humidity conditions a timer was used to cycle the test temperature conditions (typically a 6 hour cycle, 68° F. to 87° F. while maintaining greater than 94% relative humidity) at preset time intervals. In this way a number of the coal fly ash samples were incorporated into gypsum slabs and sag measurements taken after 1 day, 3 days and 7 days exposure to cycling conditions. Representative results are set forth for 4% fly ash additions in Table 1, 6% additions in Table 2, 5% additions in Table 3 and 1–15% fly ash additions in Table 4.

TABLE 1

| Coal Fly ash | 4% Addition Sag (mm) | | | % Sag Reduction |
|---|---|---|---|---|
| | 1 day | 3 days | 7 days | |
| 7/16 inch control | 3.5 | 4.5 | 6.5 | 0 |
| 9-1/6 inch control | 2.0 | 3.0 | 4.0 | 39 |
| #1 | 2.0 | 2.5 | 4.0 | 39 |

TABLE 1-continued

| Coal Fly ash | 4% Addition Sag (mm) | | | % Sag Reduction |
|---|---|---|---|---|
| | 1 day | 3 days | 7 days | |
| #2 | 2.0 | 2.0 | 3.5 | 46 |
| #3 | 1.0 | 1.5 | 2.5 | 62 |
| #4 | 1.5 | 2.0 | 3.0 | 54 |
| #5 | 2.0 | 2.5 | 4.0 | 39 |
| #6 | 2.0 | 2.5 | 4.0 | 39 |
| #7 | 3.0 | 3.5 | 6.0 | 8 |
| #8 | 2.0 | 2.0 | 3.5 | 46 |

TABLE 3

| Coal Fly ash | 6% Coal Fly Ash Addition Sag (mm) | | | % Sag Reduction |
|---|---|---|---|---|
| | 1 day | 3 days | 7 days | |
| #1 | 2.5 | 3.0 | 4.0 | 39 |
| #2 | 2.0 | 2.0 | 3.0 | 54 |
| #3 | 1.0 | 1.0 | 1.5 | 77 |
| #4 | 1.5 | 1.5 | 2.5 | 62 |
| #5 | 1.5 | 2.0 | 3.0 | 54 |
| #6 | 2.5 | 3.0 | 4.5 | 31 |
| #7 | 3.0 | 3.0 | 5.0 | 23 |
| #8 | 1.5 | 1.5 | 2.5 | 62 |

TABLE 3

| Coal Fly ash | 5% Coal Fly Ash Addition Sag (mm) | | | % Sag Reduction |
|---|---|---|---|---|
| | 1 day | 3 days | 7 days | |
| 7/16 inch control | 3.0 | 5.0 | 7.5 | 0 |
| 9/16 inch control | 1.5 | 2.5 | 4.0 | 47 |
| #9 | 2.0 | 3.0 | 5.0 | 33 |
| #10 | 1.5 | 3.0 | 4.5 | 40 |
| #11 | 1.5 | 2.5 | 3.5 | 53 |
| #12 | 2.0 | 3.5 | 5.0 | 33 |
| #13 | 2.0 | 3.5 | 5.0 | 33 |
| 7/16 inch control | 4.5 | 8.0 | 11 | 0 |
| 9/16 inch control | 3.5 | 5.5 | 7.5 | 32 |
| #14 | 3.0 | 5.0 | 7.5 | 32 |
| #15 | 3.5 | 4.5 | 6.0 | 46 |
| #16 | 2.5 | 3.5 | 4.0 | 64 |
| #17 | 1.5 | 2.5 | 3.5 | 68 |
| #18 | 2.0 | 2.5 | 3.0 | 73 |
| #19 | 1.0 | 2.0 | 3.0 | 73 |
| #20 | 2.0 | 3.5 | 4.0 | 64 |
| #21 | 1.5 | 3.5 | 4.0 | 64 |
| #24 | 2.0 | 3.5 | 4.0 | 64 |
| 7/16 inch control | 4.0 | 7.0 | 10.5 | 0 |
| 9/16 inch control | 2.0 | 4.0 | 7.0 | 33 |
| #22 | 3.5 | 6.0 | 10.0 | 5 |
| #23 | 1.5 | 3.0 | 4.5 | 48 |
| #25 | 2.0 | 3.5 | 5.5 | 48 |
| #26 | 1.0 | 2.5 | 4.0 | 62 |
| 7/16 inch control | 4.0 | 6.0 | 7.5 | 0 |
| 9/16 inch control | 1.5 | 3.5 | 4.5 | 40 |
| #27 | 1.5 | 2.5 | 2.5 | 67 |
| #28 | 3.0 | 4.5 | 5.5 | 27 |
| #29 | 2.0 | 3.0 | 4.0 | 47 |
| #30 | 3.0 | 3.0 | 3.5 | 53 |
| #31 | 2.5 | 4.5 | 5.5 | 27 |
| #32 | 1.5 | 3.0 | 4.0 | 47 |
| #33 | 1.0 | 2.0 | 2.0 | 73 |
| #34 | 2.0 | 3.0 | 4.0 | 47 |
| #35 | 0.5 | 1.0 | 1.0 | 87 |
| #36 | 1.0 | 1.0 | 1.0 | 87 |
| #37 | 2.5 | 4.0 | 5.5 | 27 |
| #38 | 0.0 | 0.0 | 0.5 | 93 |

TABLE 4

| Coal Fly ash | 1–15% coal fly ash addition* Sag (mm) | | | % Sag Reduction |
|---|---|---|---|---|
| | 1 days | 3 days | 7 days | |
| 7/16 inch control | 1.5 | 3.5 | 6.0 | 0 |

TABLE 4-continued

| Coal | 1-15% coal fly ash addition* | | | % Sag |
|---|---|---|---|---|
| Fly ash | Sag (mm) | | | Reduction |
| | 1 days | 3 days | 7 days | |
| 1% of fly ash #8 | 1.0 | 1.5 | 3.0 | 50 |
| 2% of fly ash | 0.5 | 1.5 | 2.5 | 58 |
| 3% of fly ash | 1.0 | 1.5 | 3.0 | 50 |
| 5% of fly ash | 0.0 | 0.5 | 1.0 | 83 |
| 10% of fly ash | 0.5 | 0.5 | 1.0 | 83 |
| 15% of fly ash | 0.5 | 0.5 | 0.5 | 92 |

*Cycles of 1 hour rather than 6 hours.

It is believed that variances in effectiveness among samples from the same source of coal is most likely due to variations in various soluble salt impurities during production of the fly ash. Some of these salts have varying detrimental effects in combination with gypsum slurries. Further some variance may be due to unknown histories on the coal fly ash samples including storage and handling conditions and sampling technique. With regard to samples #7 and #22, these further were observed to more resemble bottom ash than typical coal fly ash.

EXAMPLE 2

The effect of various fly ashes on the compressive strength of the gypsum core was evaluated as follows. Two inch cubes were prepared for testing in which various fly ash samples had been added at 5% by weight of stucco. For each formulation, 4 cubes were tested after drying at 115° F. to constant weight and 2 were tested after 24 hours exposure at 90° F. and 90% relative humidity. The averaged results for the cubes are given in Table 5 along with the percent sag reduction at 7 days testing for that particular fly ash sample when used at the 4% level.

TABLE 5

Compressive strength of Fly ash-Gypsum Cubes

| Fly ash Sample | Dried Compressive Strength | | Humidified | | % Sag Reduction |
|---|---|---|---|---|---|
| | psi | % Change | psi | % Change | |
| Control | 748 | 0 | 726 | 0 | 0 |
| #1 | 680 | −9 | 687 | −5 | 39 |
| #2 | 687 | −9 | 659 | −9 | 46 |
| #3 | 666 | −12 | 653 | −10 | 62 |
| #4 | 740 | −1 | 664 | −9 | 54 |
| #5 | 731 | −2 | 652 | −10 | 39 |
| #6 | 655 | −14 | 647 | −11 | 39 |
| #7 | 667 | −12 | 640 | −12 | 8 |
| #8 | 668 | −12 | 645 | −11 | 46 |

The data indicates an overall approximately 9% reduction in strength for the dry cubes, based on an average compressive strength of 682 psi for the fly ash containing samples. It was noted very little water absorption was observed in the 24 hour humidification period and subsequently very little strength was lost due to humidification in the control or the fly ash containing samples under this short humidification period. Further, there does not appear to be any significant correlation between the compressive strength of cubes and the sag reduction of the various fly ash samples evaluated.

EXAMPLE 3

A number of various coal fly ash samples were evaluated for chemical analysis, and an attempt was made to correlate any of the chemical properties to the sag reduction obtained for the fly ash sample obtained in Tables 1 and 3. Analyses were determined using X-ray fluorescence and atomic adsorption spectrometry except sulfate analysis was determined by wet chemical methods. The results, as shown in Table 6, indicate that no direct correlation can be shown for the sag reduction properties at 7 days testing to the major chemical constituent concentrations or the LOI (loss on ignition) results of the samples tested.

TABLE 6

Chemical Constituents of Fly Ash

| Fly ash Sample | % $SiO_2$ | % $Al_2O_3$ | % $FeO_3$ | % CaO | % MgO | % $Na_2O$ | % $K_2O$ | % $SO_3$ | % LOI | % Sag Reduction |
|---|---|---|---|---|---|---|---|---|---|---|
| #1 | 48.1 | 22.9 | 4.25 | 13.5 | 3.00 | 5.73 | 0.48 | 0.43 | 0.53 | 39 |
| #2 | 51.9 | 24.5 | 4.79 | 14.9 | 1.81 | 0.61 | 0.44 | 0.22 | 0.46 | 46 |
| #3 | 50.4 | 24.3 | 5.15 | 12.1 | 1.87 | 3.63 | 0.58 | 0.30 | 0.26 | 62 |
| #4 | 51.7 | 27.6 | 3.90 | 13.2 | 1.01 | 1.93 | 0.37 | 0.18 | 0.33 | 54 |
| #5 | 60.2 | 20.3 | 3.99 | 2.85 | 1.00 | 0.56 | 1.87 | 0.38 | 6.72 | 39 |
| #6 | 33.2 | 13.2 | 46.1 | 2.85 | 0.42 | 0.10 | 1.08 | 0.27 | 2.25 | 39 |
| #7 | 47.3 | 22.3 | 18.1 | 1.62 | 4.84 | 0.32 | 2.03 | 0.24 | 2.19 | 8 |
| #8 | 43.6 | 18 | 15 | 3.4 | 4.2 | 1.4 | 2.4 | 1.4 | 7.0 | 46 |
| #14 | 59.0 | 24.6 | 5.5 | 4.9 | 0.9 | 1.4 | 0.8 | 0.3 | 0.2 | 32* |
| #15 | 44.3 | 20.4 | 5.0 | 23.4 | 3.7 | 2.75 | 0.24 | 4.6 | 0.93 | 45* |
| #16 | 66.0 | 12.9 | 5.8 | 10.8 | — | 0.18 | 0.46 | 0.68 | 0.06 | 64* |
| #17 | 40.9 | 21.3 | 6.2 | 28.1 | 4.2 | — | — | 2.94 | 0.62 | 68* |
| #18 | 58.8 | 22.9 | 9.7 | — | — | — | — | 1.5 | 0.14 | 73* |
| #19 | 38.8 | 15.6 | 9.5 | 21.5 | 6.3 | 1.8 | 2.0 | 3.3 | 3.1 | 73* |
| #20 | 53.9 | 27.8 | 7.8 | 8.7 | 1.9 | 0.57 | 0.16 | 0.4 | 0.12 | 64* |
| #23 | 52.1 | 16.7 | 5.0 | 20.8 | 3.4 | 0.3 | 0.4 | 1.2 | 0.4 | 48* |
| #24 | 51.1 | 21.8 | 5.5 | — | — | — | — | 1.24 | 0.06 | 64* |
| #25 | 47.8 | 19.3 | 4.2 | 17.4 | 2.8 | 0.11 | 0.39 | 1.01 | 0.38 | 48* |
| #26 | 62.3 | 19.7 | 3.8 | 5.0 | 2.0 | 1.32 | 0.56 | 0.52 | 1.0 | 62* |

*Results at 5% addition level.

EXAMPLE 4—PHYSICAL PROPERTIES

Certain physical properties measurements were made of a number of the fly ash samples, and an attempt to correlate sag reduction activity testing at 7 days for 4% and 5% coal fly ash samples to any of those physical properties. As shown in Table 7 there does not appear to be any direct correlation to sag reduction effectiveness to any one of specific gravity (in grams per cubic centimeter) Blaine surface area (in square centimeters per gram) B.E.T. surface area (in square meters per gram) and percent retained at 44 microns.

TABLE 7

Physical Properties of Fly Ash

| Coal fly ash sample | Specific Gravity | Surface Area Blaine | Surface Area B.E.T | % Retained at 40 microns | % Sag Reduction |
|---|---|---|---|---|---|
| #1 | 2.33 | 1,404 | | 17.6 | 39 |
| #2 | 2.15 | 2,098 | | 15.3 | 46 |
| #3 | 1.91 | 2,103 | 3.7 | 17.1 | 62 |
| #4 | 1.83 | 2,946 | | 20.9 | 54 |
| #5 | 2.05 | 2,105 | | 21.3 | 39 |
| #6 | 2.99 | 1,409 | | 13.4 | 39 |
| #7 | 2.27 | 1,688 | 0.9 | 21.1 | 8 |
| #8 | 2.68 | 4,250 | 6.2 | 21.0 | 46 |
| #14 | 1.69 | 1,173 | | 31.0 | 32* |
| #15 | 2.62 | 3,732 | | 16.7 | 45* |
| #16 | 2.30 | 2,414 | | 30.0 | 64* |
| #17 | 2.65 | 3,432 | | 22.4 | 68* |
| #18 | 2.36 | 2,478 | | 23.7 | 73* |
| #19 | 2.46 | 1,682 | | 23.7 | 73* |
| #20 | 2.35 | 2,798 | | 18.7 | 64* |
| #21 | 2.53 | 1,555 | | 23.0 | 64* |
| #22 | 2.44 | 3,266 | | 25.2 | 5* |
| #23 | 2.39 | 2,715 | | 28.0 | 48* |
| #24 | 2.48 | 3,497 | | 17.4 | 64* |
| #25 | 2.42 | 3,582 | | 27.7 | 48* |
| #26 | 2.33 | 3,081 | | 23.2 | 62* |

*Results are at 5% addition of fly ash.

In a further evaluation of particle physical characteristics, various coal fly ash samples were analyzed for particle size distribution and average particle size of the sample. Table 8 sets forth representative results with an attempt to correlate such to sag reduction effectiveness at 7 days testing at 4% addition levels.

TABLE 8

Coal Fly Ash Particle Size Distribution

| Fly ash sample | Average* particle size in microns | % by weight smaller than 5 microns | % by weight smaller than 25 microns | % by weight greater than 44 microns | % Sag Reduction |
|---|---|---|---|---|---|
| 2 | 28 | 3.7 | 45.1 | 15.3 | 46 |
| 3 | 64 | 1.0 | 12.5 | 17.1 | 62 |
| 4 | 93 | 0.1 | 6.1 | 20.9 | 54 |
| 5 | 56 | 0.5 | 25.6 | 17.6 | 39 |
| 6 | 27 | 0.5 | 47.8 | 13.4 | 39 |
| 7 | 58 | 2.5 | 25.6 | 21.3 | 8 |
| 8 | 27 | 3.6 | 45.2 | 21.0 | 46 |

*By weight.

To further study this effect, coal fly ash #3 was separated into the portion passing through 325 U.S. Standard mesh and the portion retained on 325 U.S. Standard mesh. A further portion of that sample was ball milled to increase its surface area about 3 times; then gypsum slabs were prepared from the samples and evaluated for sag. Results are set forth in Table 9.

TABLE 9

| Sample | Sag (mm) 2 days | 3 days | 7 days | % Sag Reduction |
|---|---|---|---|---|
| 7/16" control | 2.0 mm | 2.5 mm | 6.5 mm | 0 |
| 9/16" control | 1.0 | 1.5 | 4.0 | 39% |
| 4% of #3 retained on 325 mesh | 1.5 | 2.0 | 5.5 | 15% |
| 4% of #3 passing 325 mesh | 1.5 | 1.5 | 3.5 | 46% |
| 4% of #3 fly ash as received (Blaine surface area 2,103 cm²/g) | 1.0 | 1.0 | 3.0 | 54% |
| 4% of #3 fly ash | 1.0 | 1.5 | 3.0 | 54% |

TABLE 9-continued

| Sample | Sag (mm) 2 days | 3 days | 7 days | % Sag Reduction |
|---|---|---|---|---|
| ball milled to 6,147 cm²/g | | | | |

In this small sampling, particle size appears to have some possible significance in that the fraction smaller than 40 microns provides significantly better beneficial effects than the fraction larger than 40 microns. However neither portion appears as effective as that sample as received and as ball milled to a surface area of 6,147 cm²/g Blaine. At this size on ball milling no significant difference was obtained in its activity compared to the received sample.

EXAMPLE 5

In another evaluation, several other inorganic materials were tested in conjunction with coal fly ash to determine their relative abilities to reduce the sag rate of gypsum slabs. The following materials were added to the gypsum slurry following the procedure set forth in Example 1, with the sag results presented in Table 10:

Expanded perlite (Blaine surface area of 2503 cm²/g)
Perlite dust waste (Blaine surface area of 8477 cm²/g and BET surface area 0.5 m²/g)
Glass microballoons (Blaine surface area 1150 cm²/g; particle size range 5–100 microns)
Fumed silica (enormous surface area could not be measured in the Blaine apparatus; BET surface area 200 m²/g)
Powdered sand (Blaine surface area 6950 cm²/g)

TABLE 10

Addition of Other Inorganic Materials

| Sample | Sag (mm) 1 days | 3 days | 7 days | % Sag Reduction |
|---|---|---|---|---|
| 7/16" control | 3.5 | 5.5 | 9.5 | 0 |
| 9/16" control | 2.0 | 3.0 | 5.5 | 41 |
| 5% perlite | 3.0 | 4.5 | 8.0 | 14 |
| 7/16" control | 1.5 | 3.0 | 4.5 | 0 |
| 9/16" control | 1.0 | 2.0 | 3.0 | 33 |
| 5% perlite dust waste | 1.5 | 3.5 | 4.5 | 0 |
| 7/16" control | 2.0 | 3.5 | 5.5 | 0 |
| 2% glass microballoons | 1.5 | 3.0 | 5.0 | 9 |
| 7/16" control | 1.5 | 3.5 | 6.0 | 0 |
| 9/16" control | 0.5 | 2.0 | 3.5 | 42 |
| 3% fumed silica | 1.0 | 1.5 | 1.5 | 75 |
| 3% powdered sand SiO₂ | 2.0 | 4.0 | 1.0 | 0 |

From Table 10 it is clear that alternative particles of other compositions having similar particle sizes and surface areas do not provide the advantages of the present invention. With regard to fumed silica it was further found that apparent sag reduction activity is transient, the material being hydroscopic and the gypsum matrix on aging picks up considerable weight gain moisture. On redrying samples at the end of 7 days testing it was found silica had a weight gain of 3% in contrast to a weight gain of 0.4% for a sample containing 4% of coal fly ash #8. To evaluate selective water absorption a sag testing comparison was made by the procedures of Example 1 except that the slab specimens were moved into the test chamber without drying the slabs prior to testing and measurements of sag were made at shorter intervals. Results are set forth in Table 11.

TABLE 11

Sag Testing of Undried Specimens

| Additive | Sag (mm) 2 hours | 6 hours | 22 hours | % Sag Reduction |
|---|---|---|---|---|
| 7/16" control | 5 | 9.5 | 21.0 | 0 |
| 9/16" control | 2.5 | 6.0 | 12.5 | 40 |
| 5% fly ash #8 | 1.0 | 1.5 | 5.5 | 74 |
| 5% fly ash #3 | 1.0 | 2.0 | 5.5 | 74 |
| 2% fumed silica | 6.5 | 10.0 | 18.5 | 12 |
| 5% perlite dust waste | 4.0 | 8.0 | 18.0 | 15 |

Figure 2A:
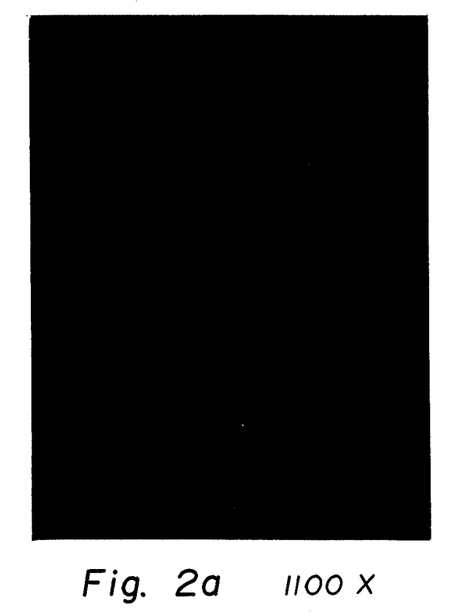
FIGS. 2a and 2b: gypsum control matrix
Figure 2B:
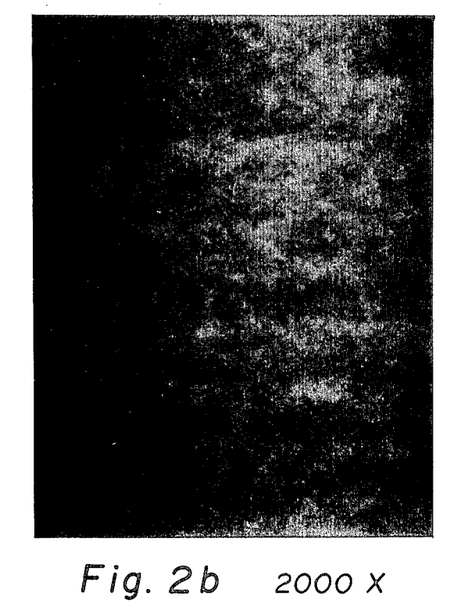
Figure 2C:
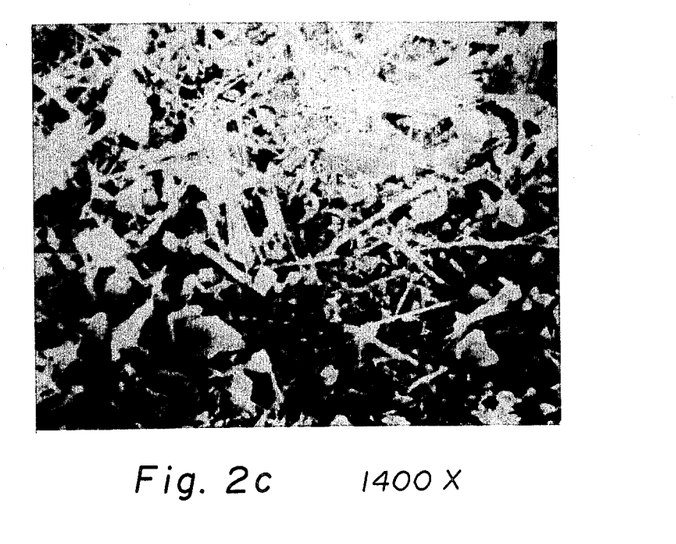
FIG. 2c: gypsum control at 3 minutes into setting of the gypsum
Figure 3A:
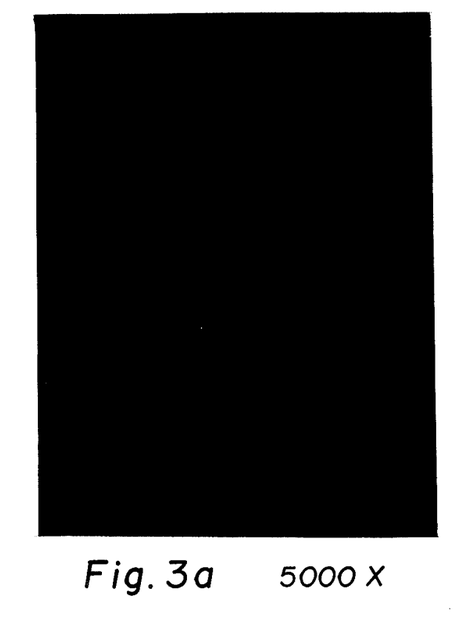
FIGS. 3a and 3b: gypsum matrix containing 3% coal fly ash
Figure 3B:
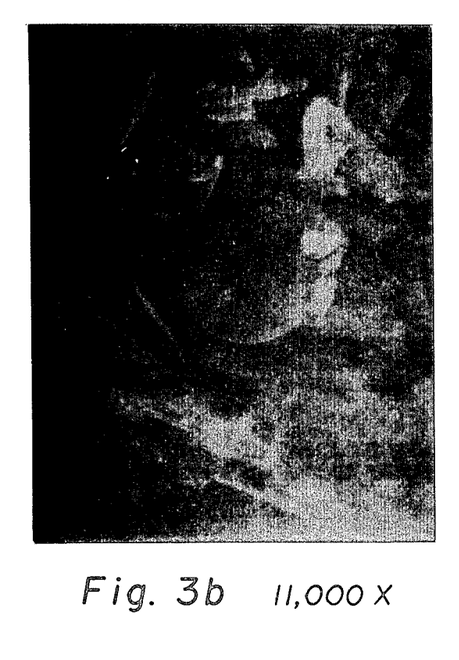
Figure 3C:
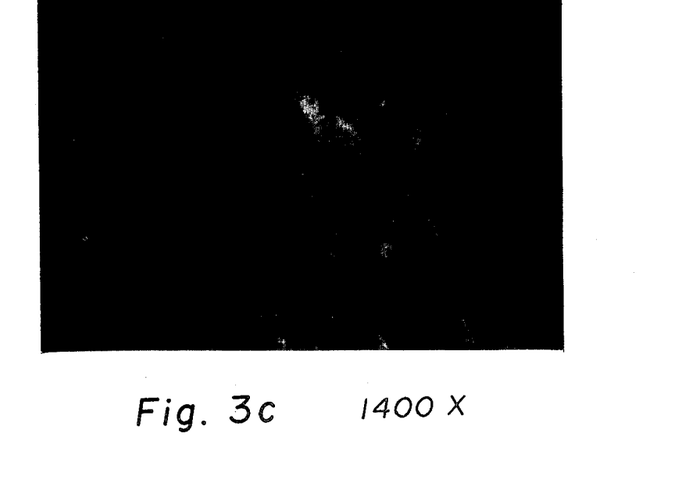
FIG. 3c: gypsum matrix containing 5% coal fly ash at 3 minutes into setting of the gypsum
Figure 3D:
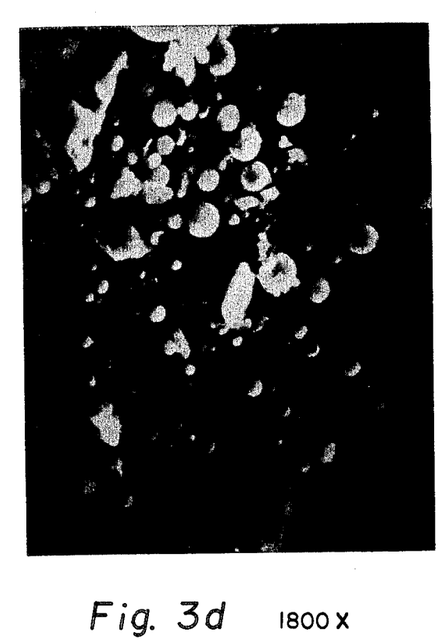
FIG. 3d: coal fly ash
Figure 4A:
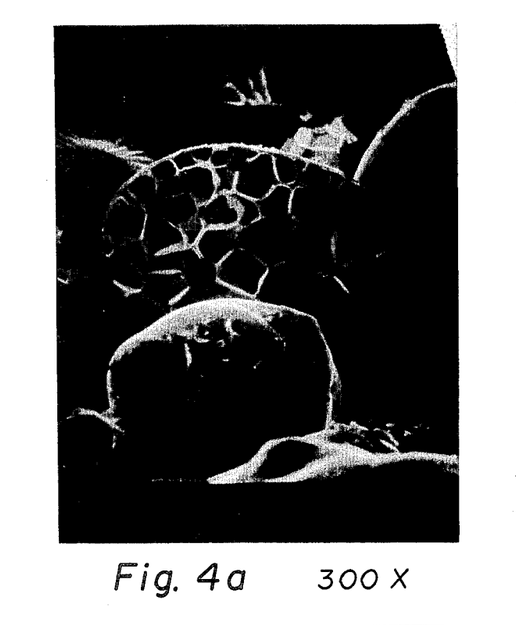
FIG. 4a: Perlite waste dust
Figure 4B:
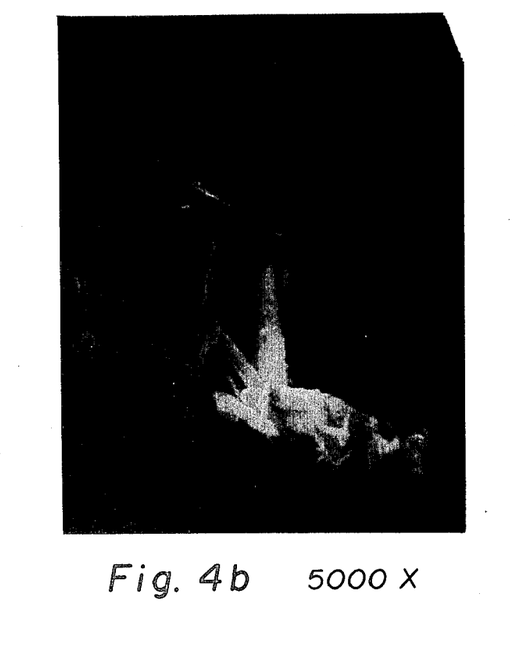
FIG. 4b: Gypsum matrix containing 3% perlite waste dust.

In further attempts to evaluate and explain the sag reduction phenomena, scanning electron micro-photographs were taken at various magnifications at various times during the hydration setting of stucco slurries ccontaining various additives. Photomicrographs of the control sample gypsum matrix, for example, are presented in FIG. 2 for comparison with generalized photomicrographs taken of a coal fly ash containing matrix in FIG. 3. FIGS. 3a-3c show close-ups of the matrix in the immediate vicinity of the coal fly ash particles. For comparison similar photographs were taken of specimens containing perlite dust waste, the photomicrographs being in FIG. 4. Viewing a large series of scanning electron microphotographs of control slabs at various magnifications revealed a trend toward a fine intergrowth of separate gypsum crystals during hydration when sag rate appeared high, as shown in FIG. 2c taken at three minutes into hydration of the sample. In contrast the crystal growth in fly ash samples during hydration tend to be slightly smaller in length and to grow more in clusters rather than as discreet single crystals as shown in FIG. 3c, also taken at three minutes into hydration of the sample. This suggests that the coal fly ash is affecting the growth of the gypsum crystals during the setting process. In the series of photographs given in FIGS. 3a and 3b of set specimens it is clearly evident that the gypsum crystals are growing into or around the fly ash particles. Photomicrographs of set slurries containing other inorganic additives did not exhibit this type of feature with such high incidence. For example, photomicrographs of gypsum crystals in the vicinity of a waste perlite dust particles, as given for comparison in FIG. 5b are more like the control specimens.

EXAMPLE 6

In another evaluation gypsum board was made in accordance with conventional practices on a gypsum board production line except for addition of either 4% or 6% coal fly ash sample #8 added to the stucco slurry. Two samples of paper wrapped board for sag testing at each fly ash concentration were obtained from the gypsum board line and evaluated under the conditions set forth in Example 1, i.e., 6 hour cycles between 87° F. and 68° F. at greater than 96% relative humidity. The specimens were compared to control specimens obtained before and after the run. The results are given in Table 12 for 16 inch length samples.

TABLE 12

| Specimens | 1 day | 3 days | 7 days | % Sag Reduction |
|---|---|---|---|---|
| ½ inch control | 3.0 | 6.5 | 10.0 | 0 |
| ⅜ inch control | 1.5 | 2.5 | 4.0 | 60 |
| 4% fly ash* | 3.0 | 5.0 | 6.5 | 35 |
| 4% fly ash* | 2.5 | 4.5 | 6.5 | 35 |
| 6% fly ash* | 2.0 | 4.0 | 5.5 | 45 |
| 6% fly ash* | 1.5 | 3.5 | 4.5 | 55 |

*Half inch samples.

Further, finished board from the board line using the indicated amounts of fly ash was found to meet all specifications for satisfactory gypsum board. From the foregoing the advantages of the present invention are apparent. While the amounts of coal fly ash to be incorporated have been set forth on a percentage of weight basis of the stucco used in mixing the gypsum board, it is further apparent that upon application of the conversion factor of about 0.86-0.89 depending on purity to account for water of hydration in the setting of the stucco to gypsum will provide the corresponding percentage by weight of fly ash incorporated in the finished gypsum board. Thus, for illustration, the addition of fly ash in concentrations of 4% by weight of stucco and 6% by weight stucco results in gypsum board products containing coal fly ash in amounts respectively of 3.4-3.5% and 5.1-5.3% by weight of gypsum. Further it will be understood that various modifications and alterations may be made in the present invention without departing from the spirit and scope of the invention as claimed.

The embodiments of the invention in which an exclusive property or privilege is claimed are defined as follows:

1. A sag resistant gypsum board consisting essentially of a monolithic cellular core of set gypsum solids from an aqueous stucco slurry and having a fibrous cover sheet encasement, with the gypsum core having incorporated therein a small amount of coal fly ash included in the slurry, the fly ash having a particle size ranging between about 0.5 and 200 microns and a BET surface area ranging between about 0.1 and 10 square meters per gram.

2. The gypsum board of claim 1 in which the coal fly ash is present in an amount by weight from about 0.8% to about 17% based on the weight of gypsum.

3. The gypsum board of claim 1 in which the coal fly ash particles are by numerical count about 90% below 50 microns.

4. The gypsum board of claim 1 in which the coal fly ash particles have a surface area by the B.E.T. method on the order of about 0.5-10 $m^2/g$.

5. The gypsum board of claim 1 in which the coal fly ash particles have a surface area measurement by the Blaine method on the order of about 1,000-6,000 $cm^2/g$.

6. The gypsum board of claim 1 having from about 1 to 6% by weight of coal fly ash based on the weight of gypsum.

7. A method of producing fiber covered gypsum board having a set core of cellular gypsum which exhibits improved sag resistance, which comprises the steps of:

(1) preparing a foamed aqueous slurry of stucco and a small amount of coal fly ash having a particle size of about 0.5-200 microns and a B.E.T. surface area between about 0.1-10 $m^2/g$;

(2) depositing the resultant slurry between fiber cover sheets;

(3) forming the slurry and cover sheets into boards of the desired dimension; and (4) drying the boards.

8. The process of claim 7 in which the slurry contains about 1-20% of coal fly ash by weight based on the weight of stucco.

9. The process of claim 7 in which the slurry contains about 3-6% coal fly ash by weight based on the weight of stucco.

10. The method of claim 7 in which the coal fly ash particles have a surface area by B.E.T. method on the order of about 0.5-10 square meters per gram.

* * * * *